United States Patent
Tiwari et al.

(10) Patent No.: US 11,437,656 B2
(45) Date of Patent: Sep. 6, 2022

(54) OPTIMIZING PERFORMANCE OF A DATA CENTER BATTERY SYSTEM

(71) Applicant: International Business Machines Corporation, Armonk, NY (US)

(72) Inventors: Awadesh Tiwari, Bangalore (IN); Ruchi Mahindru, Elmsford, NY (US); Ramshanker Kowta, Bangalore (IN); Kevin Wahlmeier, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 16/173,274

(22) Filed: Oct. 29, 2018

(65) Prior Publication Data

US 2020/0136195 A1  Apr. 30, 2020

(51) Int. Cl.
*H01M 10/42* (2006.01)
*G06N 5/04* (2006.01)
*H01M 10/48* (2006.01)

(52) U.S. Cl.
CPC .......... *H01M 10/425* (2013.01); *G06N 5/046* (2013.01); *H01M 10/48* (2013.01); *H01M 2010/4271* (2013.01); *H01M 2010/4278* (2013.01)

(58) Field of Classification Search
CPC ............... H01M 10/425; H01M 10/48; H01M 2010/4278; H01M 2010/4271; G06N 5/046
See application file for complete search history.

(56) References Cited

U.S. PATENT DOCUMENTS

| | | | | |
|---|---|---|---|---|
| 8,332,342 | B1* | 12/2012 | Saha | G01R 31/392 |
| | | | | 706/45 |
| 9,229,064 | B2* | 1/2016 | Chou | G01R 31/392 |
| 9,252,631 | B2 | 2/2016 | Latham | |
| 9,454,888 | B2 | 9/2016 | Xie et al. | |
| 9,800,073 | B2* | 10/2017 | Katsuki | H05K 999/99 |
| 2010/0250162 | A1* | 9/2010 | White | G01R 31/392 |
| | | | | 702/63 |
| 2014/0093760 | A1* | 4/2014 | Hermann | H01M 10/441 |
| | | | | 429/66 |

(Continued)

FOREIGN PATENT DOCUMENTS

| | | |
|---|---|---|
| WO | WO2017143830 | 8/2017 |
| WO | WO2017163089 | 9/2017 |

OTHER PUBLICATIONS

Mell, Peter et al.; "The NIST Definition of Cloud Computing;" National Institute of Standards and Technology; Special Publication 800-145; Sep. 2011; 7 pages.

*Primary Examiner* — Raul J Rios Russo
*Assistant Examiner* — Carl F. R. Tchatchouang
(74) *Attorney, Agent, or Firm* — Schmeiser, Olsen & Watts, LLP; Stephanie Carusillo

(57) ABSTRACT

A method of predicting future performance of a data center battery system includes receiving information related to a data center battery system in real time, analyzing the received information in real time, predicting a future performance of the data center battery system, providing the predicted future performance of the data center battery system to a data center control system, and optimizing the data center battery system based on the predicting.

20 Claims, 8 Drawing Sheets

(56) References Cited

U.S. PATENT DOCUMENTS

| | | | |
|---|---|---|---|
| 2015/0165919 A1* | 6/2015 | Hughes | H02J 7/007 320/109 |
| 2016/0041231 A1 | 2/2016 | Lee | |
| 2016/0056644 A1* | 2/2016 | Bae | H02J 7/0013 320/134 |
| 2017/0229881 A1 | 8/2017 | Pourmousavi Kani et al. | |
| 2017/0288399 A1 | 10/2017 | Fife | |

* cited by examiner

OPTIMIZING PERFORMANCE OF A DATA CENTER BATTERY SYSTEM

TECHNICAL FIELD

The present invention relates to data center systems. More specifically, the invention relates to systems and methods for predicting future performance of a data center battery systems and optimizing performance of data center battery systems.

BACKGROUND

Data centers use a significant amount of electrical power in developed countries. As data centers expand in bandwidth, cooling, space, and the like, maintaining and monitoring the batteries that power the systems becomes increasingly important and difficult. Data centers today face challenges in terms of battery availability and on-time battery backup which meet power demand. Battery reserve capacities deplete over time, with varying temperatures. Uninterrupted power supply failure results in a significant portion of the failure of a data center. Every minute a data center goes offline or loses power results in a substantial financial loss to the data center. Today, basic tools exist for providing some insight and monitoring of batteries. However, these tools are deficient. These tools are offline and are reactive—i.e. they monitor systems and provide updates after battery degradation occurs. Further, these tools fail to consider aspects of batteries and battery systems which may provide insight, predictions, and analysis related to future battery life, output, performance, efficiency, degradation, stability, and the like.

SUMMARY

An embodiment of the present invention relates to a method, and associated computer system and computer program product, for providing optimizing performance of a data center battery system. One or more processors of a computer system receive information related to a data center battery system in real time. The one or more processors of the computer system analyze the received information in real time. The one or more processors of the computer system predict a future performance of the data center battery system. The one or more processors of a computer system provide the predicted future performance of the data center battery system to a data center control system. Further the one or more processors optimize the data center battery system based on the predicting.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

The present invention improves and optimizes performance of data center battery systems. As data centers become increasingly large and complex, the battery systems which power data centers become increasingly important. Battery systems must maintain the availability of power to the data center systems as needed. Present systems for monitoring data center battery systems are offline, and they are reactive. Such monitoring systems provide information related to battery degradation after such degradation has occurred. In contrast, the present invention is capable of receiving, collecting and/or interpreting information related to a data center battery system and make predictions from this information. Contemplated by the present invention is a real-time analysis of a data center battery system including predictive analysis which is updated in real time as new information is received. Predictions may relate to battery degradation, end of life, general battery health, or predictive set points for directing data center control systems in how to control battery usage to optimize results. Still further, the present invention contemplates automatically making changes to a data center battery system related to charge, usage, and the like, based on the predictions generated. Such improvements will significantly help data centers to operate efficiently in terms of the manner in which battery power is utilized and may further prevent failures and anomalies which may be catastrophic to the operations of a data center. Thus, the present invention may be configured to optimize performance of a battery system of a data center. Such optimization may include achieving an optimization goal, as described herein below. Achieving an optimization goal may include determining that an optimization goal has been reached.

Figure 1:
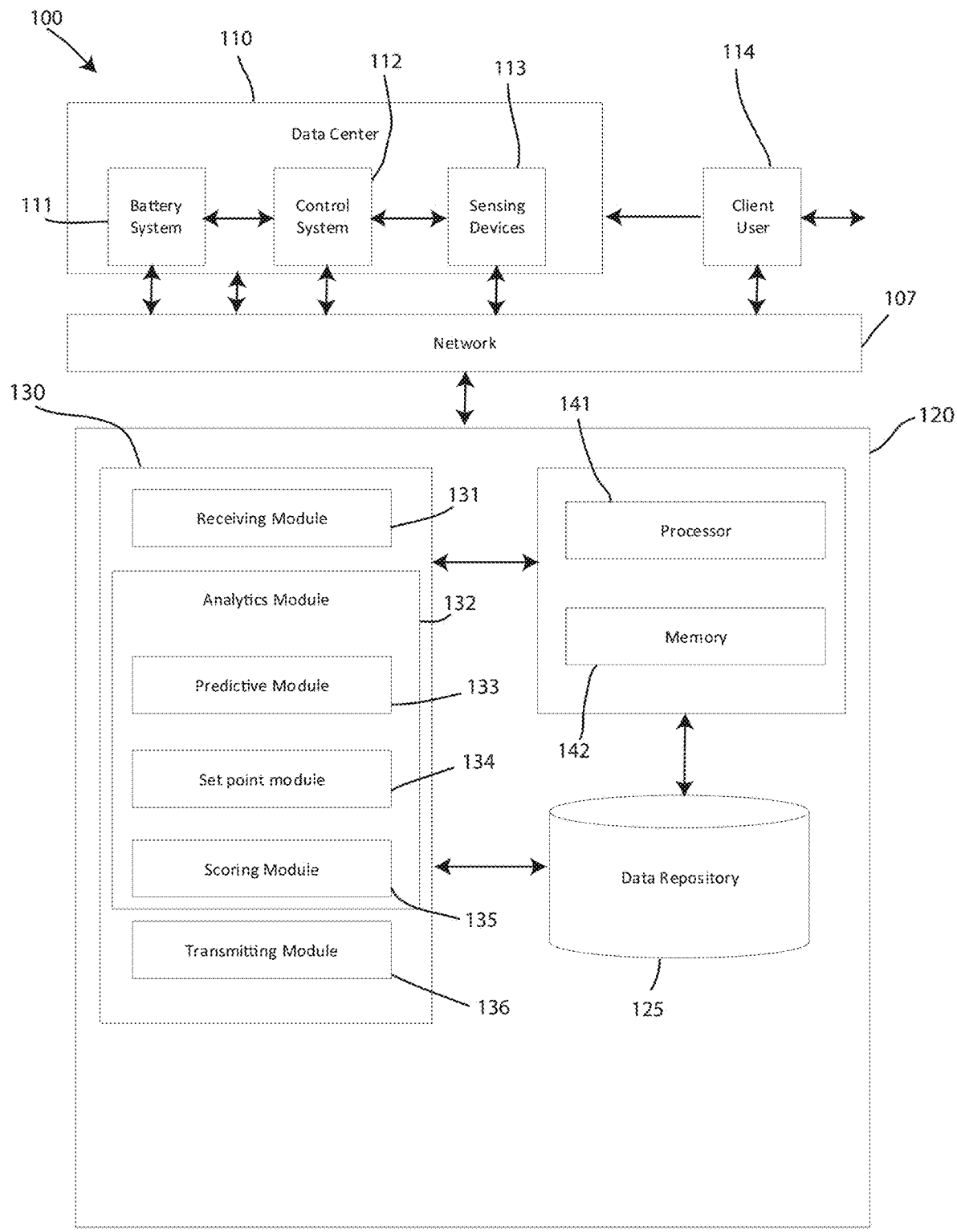
FIG. 1 depicts a block diagram of a system for optimizing performance of a data center battery system, in accordance with embodiments of the present invention.

Referring to the drawings, FIG. 1 depicts a block diagram of a system for optimizing performance of a data center battery system 100, in accordance with embodiments of the present invention. Embodiments of a system for optimizing performance of a data center battery system 100 may be described as a system for predicting performance or improving performance of a data center battery system. It is further contemplated that the system for predicting future performance of a data center battery system 100 may be configured to predict future performance and/or improve a single battery within a data center.

The system for optimizing performance of a data center battery system 100 may include a data center 110 and a client user 114 connected over a network 107 to a computer system 120. The data center 110 may include a battery system 111 that includes one or more data center batteries. The data center 110 may further include a control system 112 coupled to the battery system 111. Further, the data center 110 may include one or more sensing devices connected or otherwise operably sensing the battery systems 111.

The data center 110 may be a data collection area connected to the network 107. The data center 110 may include one or more servers and racks connected to the data center for storing and collecting data. The data center 110 may include one or more buildings, information technology equipment, electrical infrastructure, backup generators, cooling equipment, automatic transfer switches, power distribution units, and the like. The data center 110 may be configured to receive data transmitted back and forth between various nodes or connected devices that are accessible to the network 107 (not shown). The data center 110 may be configured to selectively store data from various devices or systems connected to the network 107. For example, the data center 110 may save and catalogue user data sent over user devices on a given platform. In some embodiments, the data center 110 may include one or more analytic modules capable of analyzing data being stored within the data center 110. Further, the computer system 120 may be integrated with or as a part of the data center 110 in some embodiments, rather than separate from the data center 110 as shown in FIG. 1. In some alternative embodiments, the data center 110 may be connected locally to the computer system 120.

The data center 110 is shown further including a battery system 111. The battery system 111 may include one or more batteries. The batteries may be lead-acid batteries (both valve and vent regulated) lithium ion batteries, or the like. A battery system 111 may be considered a single battery, for example, that is composed of a plurality of cells. The batteries in the battery system 111 may be installed on battery racks, within battery cabinets or the like. The battery system 111 may be configured to convert AC current into DC current that is used to maintain the battery in a charged state. The battery system 111 may be configured to store energy. Further, the battery system 111 may be configured to convert stored DC current back to AC current for consumption by the critical loads in the data center 110, such as the various servers of the data center 110. The battery system 111 may be what makes the data center 110 an "uninterruptable" system.

The data center 110 is shown further including a control system 112. The control system 112 may be configured to control and/or monitor the data center 110. The control system 112 may include some control mechanisms for controlling and/or monitoring the battery system 111. For example, the control system 112 may be configured to monitor loading on the battery system 111. Further, the control system 112 may be configured to facilitate and direct charging of the batteries within the battery system 111. Still further, the control system 112 may be configured to charge the batteries using intermittent charging methods or using float charging methods. Aspects of the present invention may be applicable for data centers 110 having various degrees of control and/or monitoring of the systems therein, including the battery system 111. The control system 112 may be in communication with the computer system 120. Alternatively, the computer system 120 may be incorporated within the control system 112 in one embodiment.

The data center 110 is shown further including sensing devices 113. The sensing devices 113 may be configured to detect various aspects related to the data center 110. The data center 110 may include sensing devices 113 that are particularly configured to sense or otherwise detect states related to the batteries in the battery system 111. For example, the sensing devices 113 may be configured to detect degradation, temperature, current, voltage, charge, capacitance, or the like. The sensors 113 may be connected to the control system 112 and/or the computer system 120 over the network 107. The sensing devices 113 may be integrated within, attached to, or otherwise operably connected to the batteries and/or the battery system 111.

A client user 114 is shown connected to the data center 110 and further connected to the network 107. The client user 114 may be a system or device separate from the data center 110. The client user 114 may be a monitoring and/or control system that is the same or similar to the control system 112 of the data center 110. The client user 114 shows that the system for optimizing performance of a data center battery system 100 may include a data center 110 that is controlled or otherwise monitored internally by a control system such as the control system 112, or externally by a third party monitoring client such as the client user 114. Thus, the client user 114 may be in communication with the computer system 120. Alternatively, the computer system 120 may be incorporated within the client user 114 in one embodiment.

The network 107 may be any group of two or more computer systems linked together. The network 107 may represent, for example, the internet. The network 107 may be any type of computer network known by individuals skilled in the art. Examples of computer networks which may be embodied by the network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

Embodiments of the computer system 120 may include a receiving module 131, an analytics module 132, a predictive module 133, a scoring module 134, a set-point module 135, and a transmitting module 136. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the receiving module 131 may include one or more components of hardware and/or software program code for obtaining, retrieving, collecting, or otherwise receiving information from the data center 110, the battery system 111, the control system 112, the sensing devices 113 and/or the client users 114. In an exemplary embodiment, the receiving module 131 may be configured to receive information from data center 110 and/or the client user 114. For example, the receiving module 131 may be configured to receive information detected from the sensing devise 113. Further, the receiving module 131 may be configured to receive information directly from the battery system 111 or the control system 112. The receiving module 131 may provide information received by the computer system 120 from the data center 110, the battery system 111, the control system 112, the sensing devices 113 and/or the client users 114 to be stored in the data repository 125.

Figure 2:
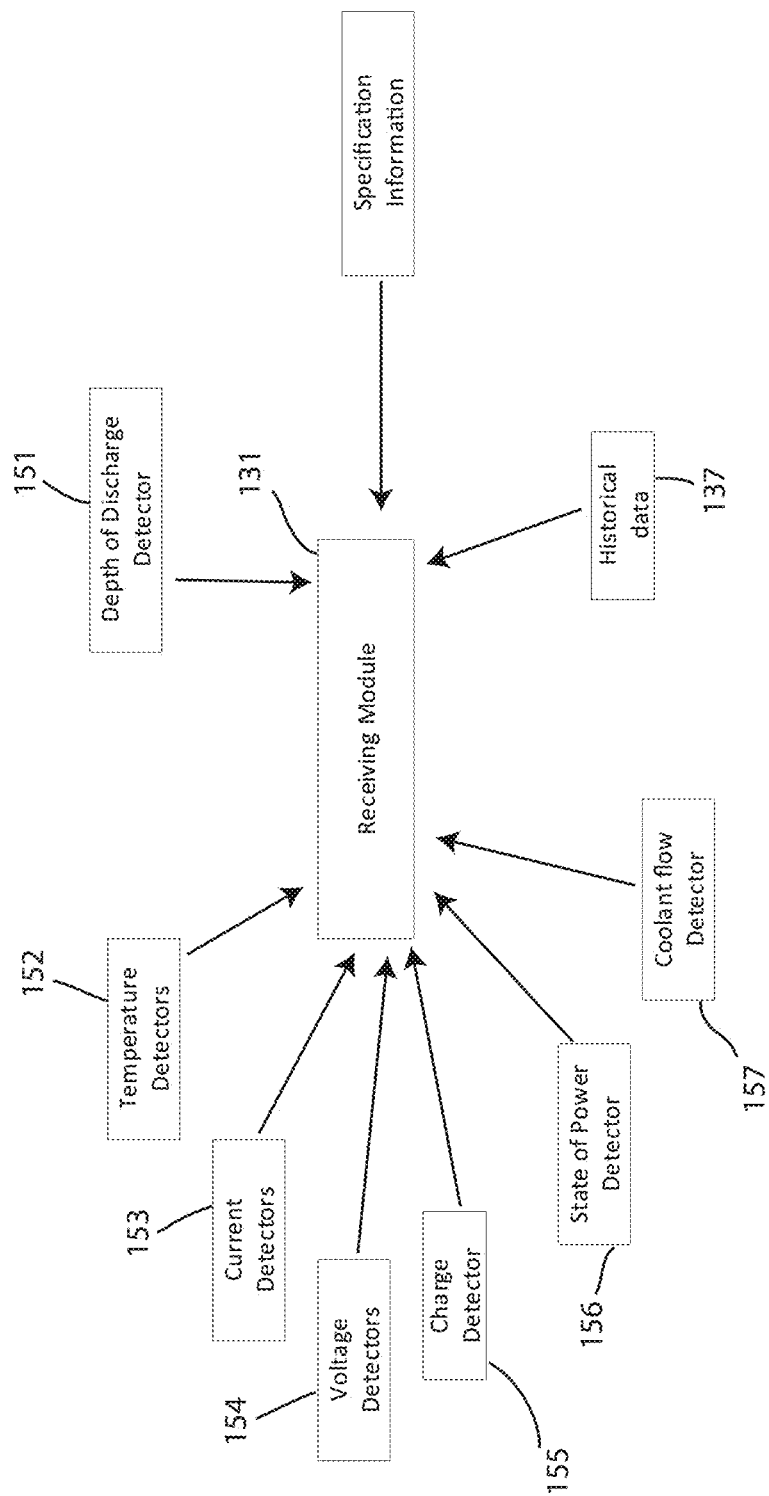
FIG. 2 depicts a block diagram of a receiving module of the system of FIG. 1 with a plurality of information sources, in accordance with embodiments of the present invention.

As shown in FIG. 2, a block diagram of the receiving module 131 is depicted with a plurality of information sources. In particular, the receiving module 131 may be configured to receive information from depth of discharge detectors 151, temperature detectors 152, current detectors 153, voltage detectors 154, charge detectors 155, state of power detectors 156, coolant flow detectors 157 and the like. The detectors 151, 152, 153, 154, 155, 156, 157 may comprise the sensing devices 113 of the data center 110. The detectors 151, 152, 153, 154, 155, 156, 157 may be any types of devices configured to sense or detect information related to the battery system 111. The detectors 151, 152, 153, 154, 155, 156, 157 may be provided at least in part by a battery management system (BMS) or data center infrastructure management (DCIM) system, for example. A BMS or DCIM may comprise an electronic system for managing batteries in the battery system 111, and may include tracking of various data using the sensing devices 113.

Still further, the receiving module 131 may be configured to receive historical data or information 137 related to the battery system 111 or the data center 110. For example, the historical data 137 may include outage information related to past outages of the data center 110. The historical data 137 may include number of events and/or alarms related to the battery system 111. The historical data 137 may include historical electrical data, load profile data, low battery condition information, and the like. The historical data 137 may include information related to when a battery was last replaced in the battery system 111.

Also shown in FIG. 2, the receiving module 131 may be configured to receive specification information 138. The specification information 138 may be related to engineering specifications or the like of the data center 110, the battery system 111, the control system 112, the sensing devices 113, and/or the client user 114.

Referring still to FIG. 1, embodiments of the computer system 120 may further include an analytics module 132. Embodiments of the analytics module 132 may include one or more components of hardware and/or software program code for analyzing information received by the receiving module 131 or stored in the data repository 125. The analytics module 132 may be configured to analyze information in real time as the information is received by the receiving module 131. The analytics module 132 may be a cognitive modeling engine or the like and may be configured to analyze received information in real time. The analytics module 132 is shown encompass multiple sub modules—the predictive module 133, the scoring module 134 and the set-point module 135, each of which described herein below.

The analytics module 132 may be configured to include algorithms with which to analyze the information received by the computer system 120. The analytics module 132 may be configured to analyze not only the information received in real-time by the receiving module 131, but also the historical data 137 that had been previously received by the receiving module 131, and the specification information 138 received by the receiving module 131. Each of these various sources of information may be cognitively analyzed by the analytics module 132 to perform various diagnostics, provide various predictions, alarm controllers of the data center 110 or the like, as described herein below.

The analytics module 132 may be configured to process information received by the receiving module 131 and create determinations, analytics, notifications, alarms, or the like which may be provided by the transmitting module 136 to a user, client, control system, or the like. For example, the analytics module 132 may be configured to compile the information received into graphs that update in real time as new information is received. Graphs compiled, created or collected by the analytics module 132 may relate to charge, load, voltage, capacitance, internal temperature, or other variables of the batteries in the battery system 111 that are desired to be monitored by a client or data center control system 112. These analytical graphs may be created or otherwise generated the analytics module 132 and provided to the control system 112 and/or the client user 114 by the transmitting module 136.

In one embodiment, the analytics module 132 may be configured to review information received and determine or otherwise create a characterization of general battery state and/or general battery degradation for one or more batteries in the battery system 111. For example, the analytics module 132 may include an algorithm that includes the following exemplary formula for providing a value based on the battery state of batteries in the battery system 111:

$$\text{Generalized Battery Degradation}(t+1) = a1^*(\text{voltage drop})^\wedge + a2^*(\text{voltage drop}) + b1^*(\text{discharge current rate})^\wedge + b2^*(\text{discharge current rate})^\wedge + b3^*(\text{discharge current rate}) + c1^*(\text{internal heat})^\wedge + c2^*(\text{internal heat}) + d1(t+1)^*(\text{real state of battery}(t)) + d2(t)^*(\text{ratio of predicted versus actual state}(t))$$

where a1, a2, b1, b2, c1, d2, d1, d2 are weighted factors, and where t is time. It should be understood that this is an exemplary formula with exemplary variables that may be calculated by the analytical module 132. Other formulas are contemplated using less variables, or more variables, than the above described formula.

Embodiments of the predictive module 133 may include one or more components of hardware and/or software program code for predicting a future performance of the data center battery system 111. Predictions may relate to predictive alarms, warnings or notifications, battery end of life predictions, predictive set points, predictive scoring, predictive battery degradation, or the like. In one embodiment, a predictive alarm may be determined or otherwise calculated from the following exemplary formula:

$$\text{Predictive Alarm value}(t+1) = w1^*(\text{UPS capacitance}(t)) + w2^*(\text{UPS internal temp}(t)) + w3^*(\text{outages ups bat}(t)) + w4^*(\text{load frequency}(t)) + w5^*\text{norm}(\text{rate drop voltage discharge}(t)) + w6^*\text{norm}(\text{capacity rate drop}(t)) + w7^*\text{norm}(\text{discharge current rise}(t)) + w8^*\text{norm}(\text{temperature change discharge}(t)) + w9^*\text{norm}(\text{battery degradation}(t)) + w10^*(\text{increase decrease rate alarm vs ups battery replace time degradation rate}(t))$$

where w1, w2, w3, w4, w5, w6, w7, w8, w9 and w10 are weighted factors, and where t is time. It should be understood that this is an exemplary formula with exemplary variables that may be calculated by the analytical module 132. Other formulas are contemplated using less variables, or more variables, than the above described formula.

In still another embodiment, a predictive battery state or predictive battery degradation may be determined or otherwise calculated.

With continued reference to FIG. 1, embodiments of the computer system 120 may include a scoring module 134. Embodiments of the scoring module 134 may include one or more components of hardware and/or software program code for generating and/or calculating a current or predictive health score of the battery system 111 and/or one or more batteries of the battery system 111. A current health score may be calculated based on factors or variables such as the number of alarms related to the battery system 111 recently raised. In other embodiments, the current health score of the battery system 111 may be based on other information, such as the last time a battery was changed, or the like.

The scoring module 134 may be configured to provide a predictive health score of the battery system 111, in addition to a current health score. The predictive health score may be calculated using the following exemplary formula:

Predictive health score$(t+1)=h1(t)*$(health score$(t)$)+ $h2(t)*$(frequency alarm value$(t)$)+$h3(t)*$(battery degradation$(t)$)+$h4(t)*$(frequency back up power $(t)$)+$h5(t)*$(score versus performance index$(t)$)

where h1, h2, h3, h4 and h5 are weighted factors, and where t is time. It should be understood that this is an exemplary formula with exemplary variables that may be calculated by the scoring module 134. Other formulas are contemplated using less variables, or more variables, than the above described formula.

With continued reference to FIG. 1, embodiments of the computer system 120 may include a set-point module 135. Embodiments of the set-point module 135 may include one or more components of hardware and/or software program code for creating, generating, determining, or otherwise selecting one or more set-points. A set-point may provide a framework for guiding the control system 112 and/or the client user 114 with properly using the battery system 111. For example, the set-point module 135 may provide set points of battery current, voltage drops, or the like. The set-point module 135 may select, choose, or determine a set-point that would provide the highest operational range of one or more batteries in the battery system 111, for example. The set-points created by the set-point module 135 may be configured to anticipate and prevent failures or anomalies in the battery system 111 if the control system 112 or the client user 114 abides by the guidance provided by the set-points.

With continued reference to FIG. 1, embodiments of the computer system 120 may include a transmitting module 136. Embodiments of the transmitting module 136 may include one or more components of hardware and/or software program code for notifying, alarming, or otherwise transmitting or providing information related to the data center battery system 111 to a data center control system 112 or other client user 114. The transmitting module 136 may be configured, for example, to transmit audible notifications or transmissions. Alternatively, the transmitting module 136 may be configured to provide information to a display of a user device such as the client user 114 or a computer display of the control system 112. The transmitting module 136 may be configured to generate a user interface for providing useful information to the client user 114 and/or the control system 112 in a format that can be understood.

The transmitting module 136 may further be configured to send controlling signals or information that is configured to optimize the data center battery system 111 based on the predicting. For example, the transmitting module 136 may be configured to actually control battery usage of one or more batteries in the battery system 111. For example, when set-points are determined by the set-point module 135, the optimizing by the transmitting module 136 may include transmitting a control signal to the battery system 111 that abides by the set-points created by the set-point module 135. Thus, the computer system 120 may be configured to optimize the battery system 111 by achieving a particular setpoint or goal that was determined by the set-point module 135. Optimization may be considered achieved or completed when the setpoint determined by the set-point module 135 has been reached.

The transmitting module 136 may thus be configured to automatically control the battery system 111 based on the cognitive analysis of the modeling engine within the analytics module 132 of the computer system 120. The automatic control may be choosing how and when to charge one or more batteries in the battery system 111 such as by selecting a charge technique, for example, from either intermittent or float charging. In one embodiment, the optimization may be determined completed when the transmitting module 136 provides a control instruction to charge the batteries and the charging is complete, or the charge reaches a predetermined level set by the set-point module 135, for example.

The automatic control may select which batteries in the battery system 111 are utilized for powering the data center 110 in the event that battery power is necessary. The automatic control may further select how much power is provided by various batteries, cells or the like, of the batteries in the battery system 111 at a given time. Optimization may include determining the optimal power level of outputs by the batteries of the battery system 111 and reaching this optimal power level.

The transmitting module 136 may further be configured to automatic control robots within the battery system 111 and/or the data center 110. For example, the transmitting module 136 may be configured to provide control signals that direct robots, machines or equipment to automatically change batteries, or perform other maintenance within the battery system 111. Optimization may be determined to be complete when a robot has accomplished an optimization task. The transmitting module 136 may be configured to direct automated devices within the data center 110 and/or battery system 111 such that such devices will automatically perform maintenance related to the battery system 111.

Still further, the transmitting module 136 may be configured to provide automatic directions directly to maintenance crews or operators of the data center 110 directing such operators to perform maintenance functions. Sensors, vision systems, or the like located within the data center 110 may be in communication with the computer system 120. Such sensors, vision systems or the like may be configured to provide information to the computer system 120 necessary for the computer system 120 to monitor and determine when such tasks are completed. The transmitting module 136 may be configured to provide reminders, alerts, or the like, in relationship to battery maintenance tasks.

Optimization(s) of the battery system 111 accomplished by the instructions, directions, control signals or the like provided by the transmitting module 136 may be considered completed after predetermined functions have been accomplished, or predetermined levels of charge, battery degradation, power expenditures, or the like, are reached by the elements of the battery system 111. Various forms of optimization are contemplated herein, each based on the analysis and/or predictions determined by the analytics module 132 and/or set-point module 135. Further, whether or not an optimization goal is or has been achieved may be determined by the analytics module 132 based on feedback information provided to the computer system 120 through the receiving module 131.

While the above described modules 131, 132, 133, 134, 135, 136 have been described as separate components of the computer system 120, the modules 131, 132, 133, 134, 135, 136 may be a single combined computer program. While some of the modules 131, 132, 133, 134, 135, 136 may be separate, others may be combined or overlap in functionality with each other.

Referring still to FIG. 1, embodiments of the computer system 120 may be equipped with a memory device 142 which may store the information related to the data center 110 and/or the battery system 111 thereof. The computer system 120 may further be equipped with a processor 141 for implementing the tasks associated with the system for optimizing performance of a data center battery system 100.

Figure 3:
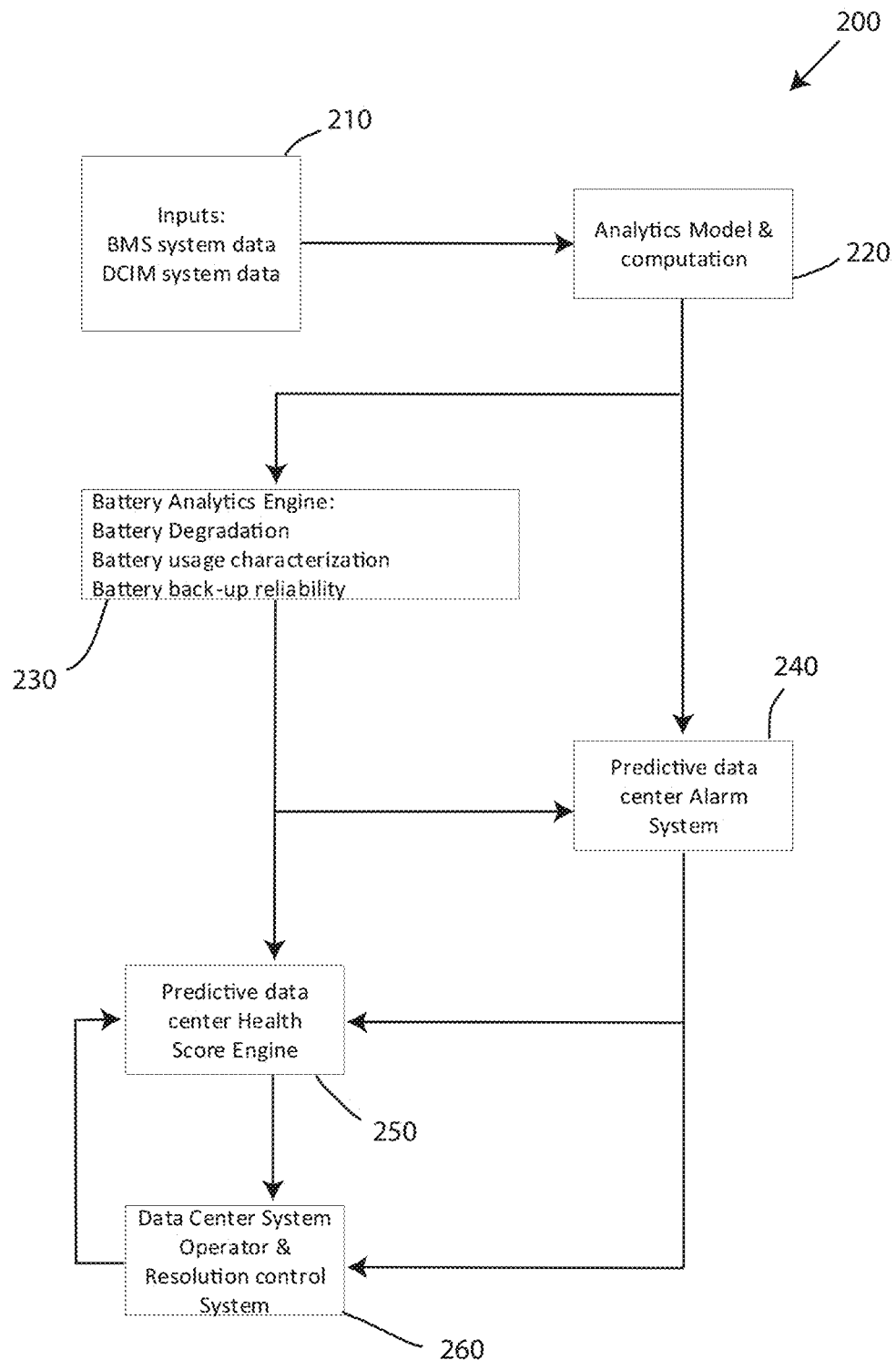
FIG. 3 depicts a flow chart of a method for optimizing performance of a data center battery system, in accordance with embodiments of the present invention.

FIG. 3 depicts a flow chart of a method 200 for predicting by a computer system, such as the computer system 120, future performance of a data center battery system, such as the battery system 111 of the data center 110, in accordance with embodiments of the present invention. The method 200 may include a first step 210 of receiving inputs by the computer system from a battery management system (BMS) or data center infrastructure management (DCIM) system, for example. The method 200 may include a second step 220 analyzing by the computer system the information provided with a modeling and computations, by for example, the analytics module 132 or the sub-modules thereof. The method 200 may include next step 230 of providing battery analytics by the computer system related to battery degradation, battery usage, or battery back-up reliability. The method 200 may include a step 240 of providing a predictive alarm by the computer system to a data center related to a battery system. The method 200 may include a step 250 of predicting a data health score of a data center battery system. The method 200 may include a step 260 of transmitting or otherwise providing the information generated in the steps 220, 230, 240, 250 to a data center control system, such as the control system 112, or other client user, such as the client user 114.

Figure 4:
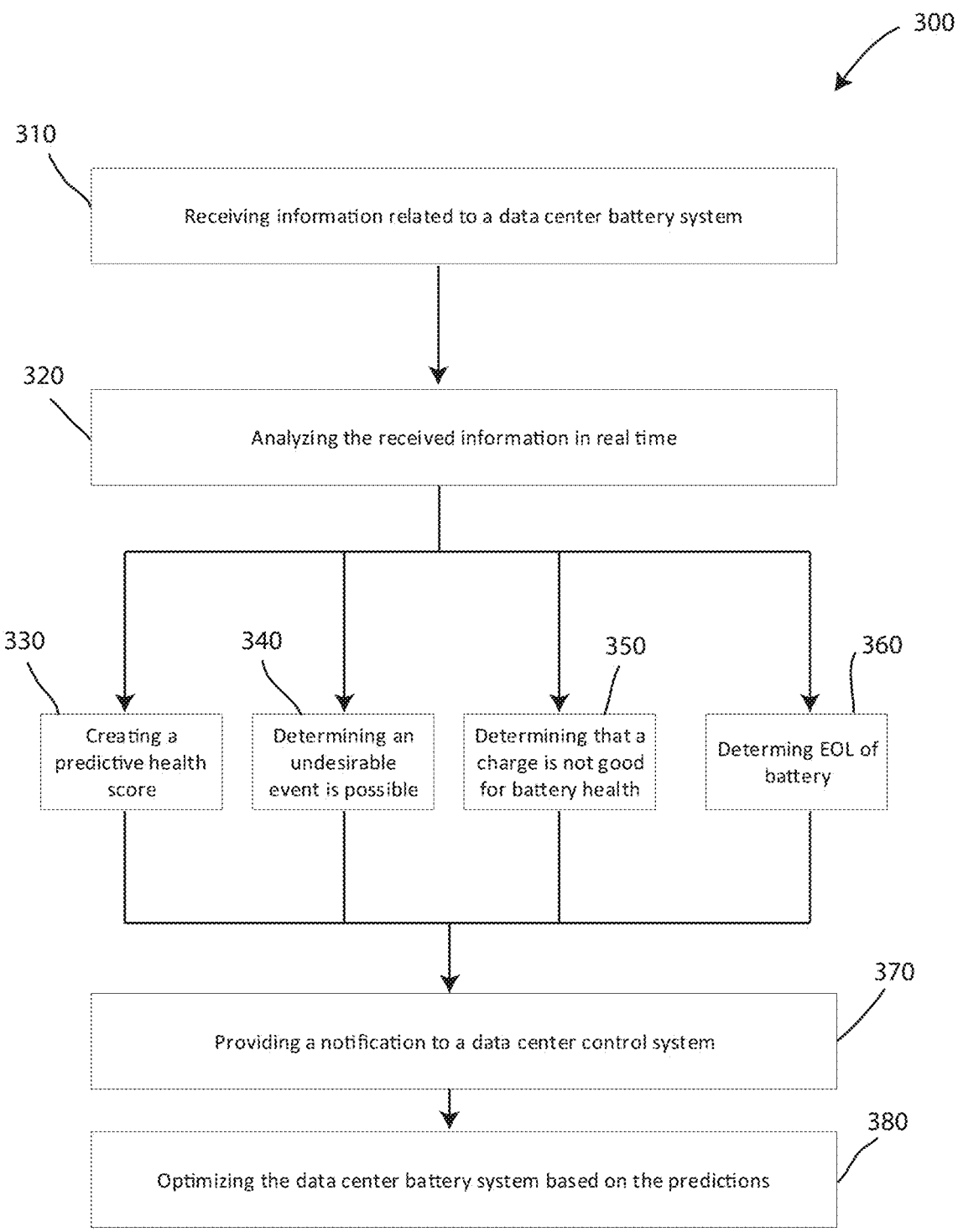
FIG. 4 depicts a flow chart of a method for optimizing performance of a data center battery system, in accordance with embodiments of the present invention.

FIG. 4 depicts a flow chart of a method 300 for optimizing performance of a data center battery system, such as the battery system 111, in accordance with embodiments of the present invention. The method 300 may include a first step 310 of receiving, by one or more processors of a computer system, such as the computer system 120, information related to a data center battery system, for example in real time. The method 300 may include a second step 320 of analyzing, by the one or more processors of the computer system, the received information in real time. The method 300 includes four potential next steps 330, 340, 350, 360 related to predicting, by the one or more processors of the computer system, a future performance of the data center battery system. For example, step 330 includes creating, by the one or more processors of the computer system, a predictive health score of the data center battery system based on the analyzing in step 320. Step 340 includes determining, by the one or more processors of the computer system, that an undesired event is possible related to the data center battery system. Step 350 includes monitoring, by the one or more processors of the computer system, a degradation rate of at least one battery in the data center battery system and determining, by the one or more processors of the computer system, that a charge is not good for the health of the at least one battery. Step 360 includes determining or predicting the end of life of at least one battery of the data center battery system based on the analyzing and based on the physical properties of the at least one battery. The method 300 includes a step 370 of providing or transmitting a notification to a data center control system, such as the control system 112 or the client user 114. The step 370 for example, may include providing, by the one or more processors of the computer system, a predicted future performance of the data center battery system to a data center control system. The step 370 may include providing, by the one or more processors of the computer system, the predictive health score of the data center battery system to the data center control system. The step 370 may include generating, by the one or more processors of the computer system, a notification to the data center control system that the undesired event is possible. The step 370 may include generating, by the one or more processors of the computer system, an alarm based on the determining that the charge is not good for the health of the at least one battery and providing this alarm to the data center control system. The step 370 may include providing, by the one or more processors of the computer system, the end of life information to the data center control system. The method 300 may further include a step 380 of optimizing the data center battery system based on the predicting. The step 380 may be accomplished by, for example, controlling the data center battery system directly with control signals or instructions by the transmitting module 136 as described above. In other embodiments, the step 380 may be accomplished through the sending of other information or signals by the computer system 120 to the control system 112 of the data center 110 for the purposes of optimization of the battery system 111.

Figure 5:
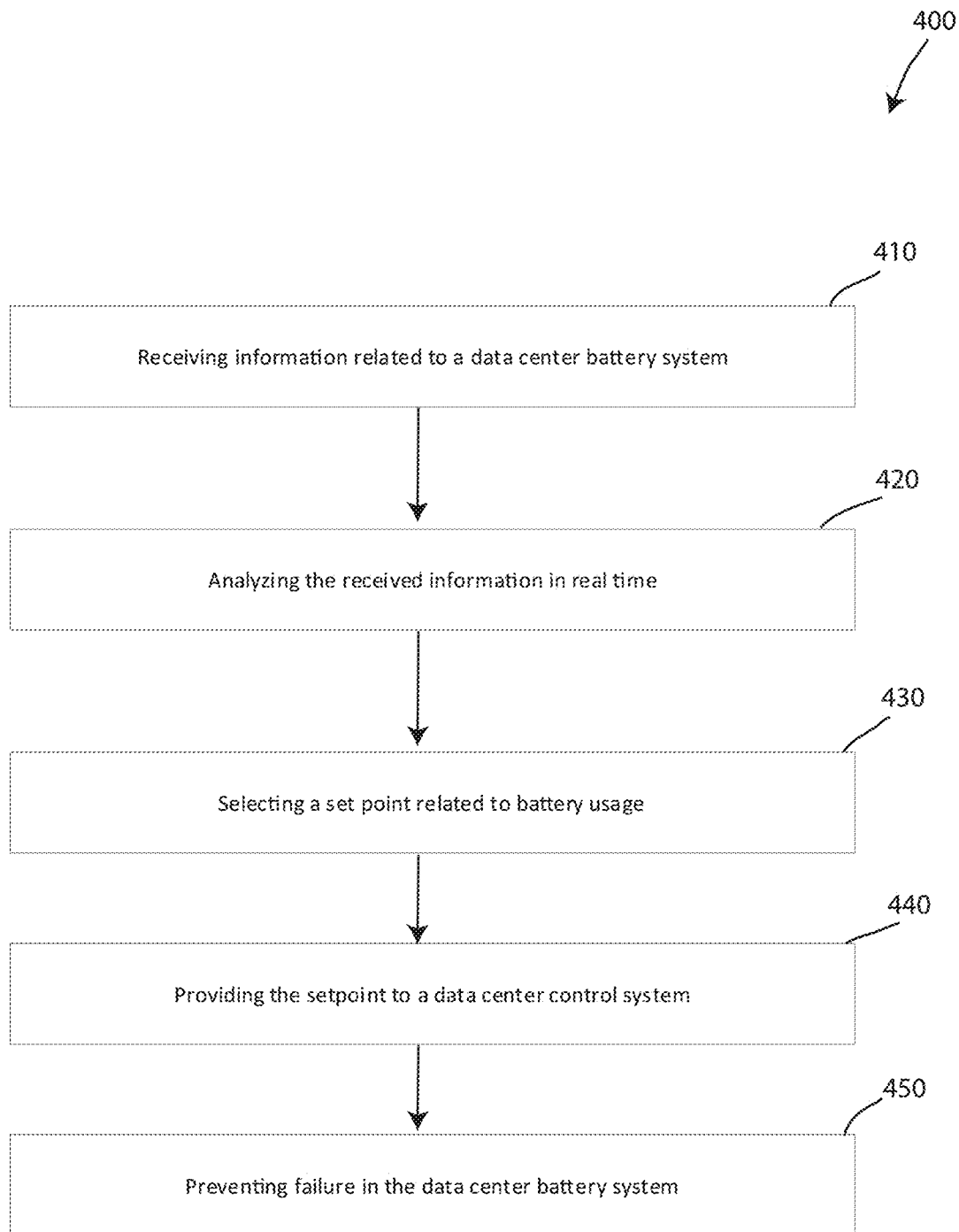
FIG. 5 depicts a flow chart of a method for optimizing performance of a data center battery system, in accordance with embodiments of the present invention.

FIG. 5 depicts a flow chart of a method 400 for optimizing performance of a data center battery system, such as the system 100, in accordance with embodiments of the present invention. The method 400 includes a first step 410 of receiving, by one or more processors of a computer system, such as the computer system 120, information related to a data center battery system, for example in real time. The method 400 may include a second step 420 of analyzing, by the one or more processors of the computer system, the received information in real time. The method 400 includes a next step 430 of selecting, by the one or more processors of the computer system, such as by the set-point module 135, a set point related to battery usage of at least one battery in the data center battery system, wherein the selected set point is configured to provide the highest operational range to the at least one battery. The method 400 includes a step 440 of providing, by the one or more processors of the computer system, the set point to the data center control system. The method 400 includes another step 450 of preventing a failure in the data center control system by implementing a battery state in the at least one batter based on the set point.

Figure 6:
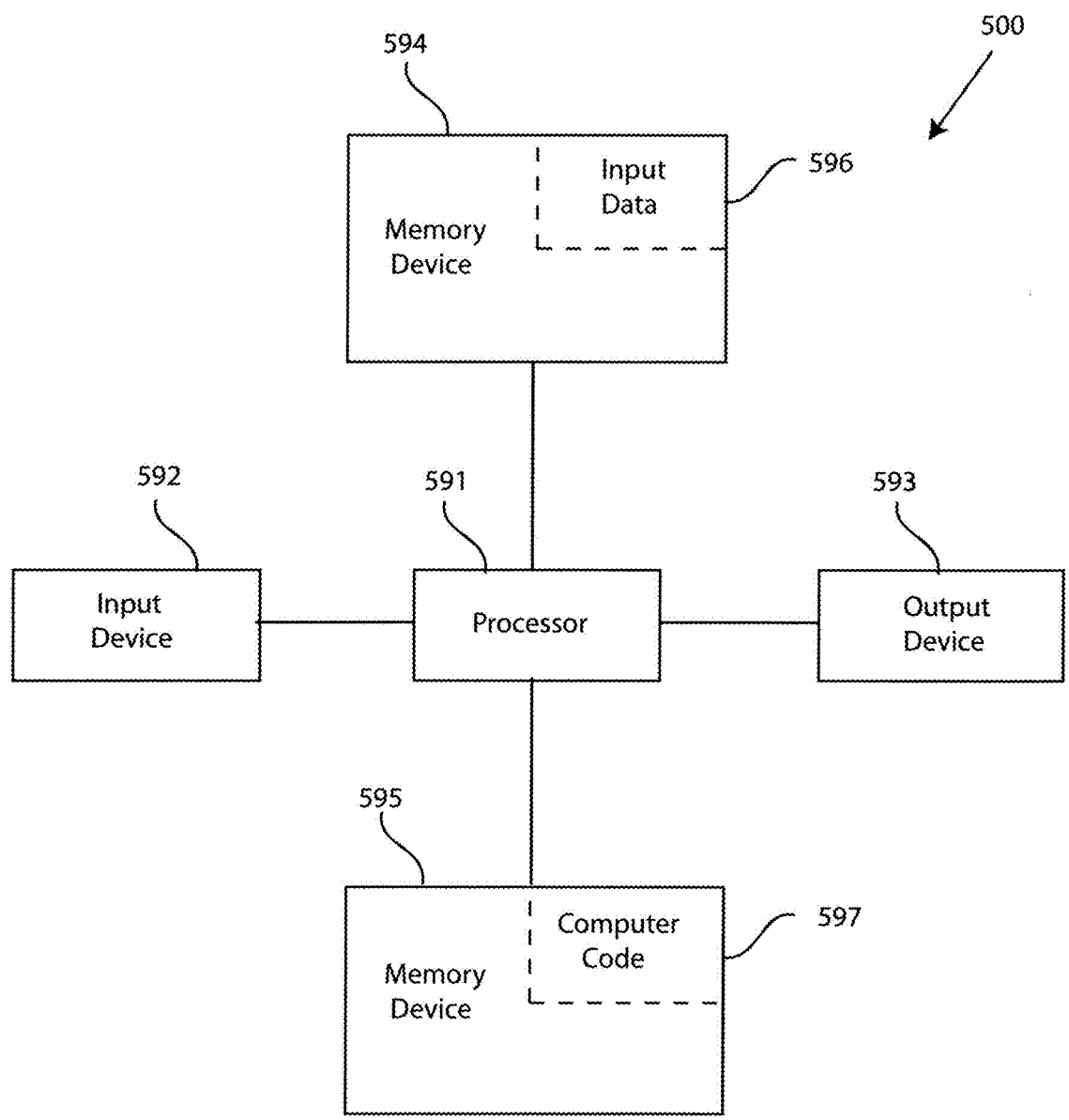
FIG. 6 depicts a block diagram of a computer system for the system for optimizing performance of a data center battery system of FIGS. 1-2, capable of implementing methods for optimizing performance of a data center battery system of FIGS. 3-5, in accordance with embodiments of the present invention.

FIG. 6 illustrates a block diagram of a computer system that may representative of any computer or computer system within the system for optimizing performance of a data center battery system of FIGS. 1-2, capable of implementing methods for optimizing performance of a data center battery system of FIGS. 3-5, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for optimizing performance of a data center battery system, in the manner prescribed by the embodiments of FIGS. 3-5 using the system for optimizing performance of a data center battery system of FIGS. 1-2, wherein the instructions of the computer code 597 may be executed by processor 591 via memory device 595. The computer code 597 may include software or program instructions that may implement one or more algorithms for implementing the methods of optimizing performance of a data center battery system, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system, and in a third embodiment, the present invention may be a computer program product. Any of the components of the embodiments of the present invention can be deployed, managed, serviced, etc. by a service provider that offers to deploy or integrate computing infrastructure with respect to systems and methods for optimizing performance of a data center battery system. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a system for optimizing performance of a data center battery system. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for optimizing performance of a data center battery system. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for optimizing performance of a data center battery system.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
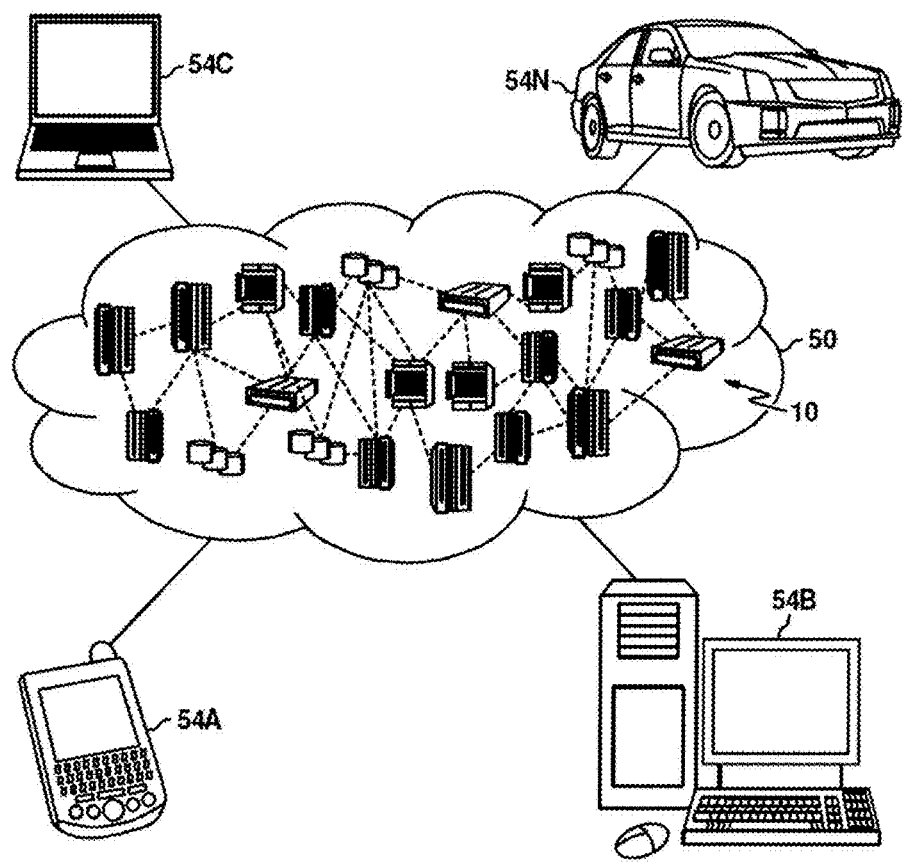
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
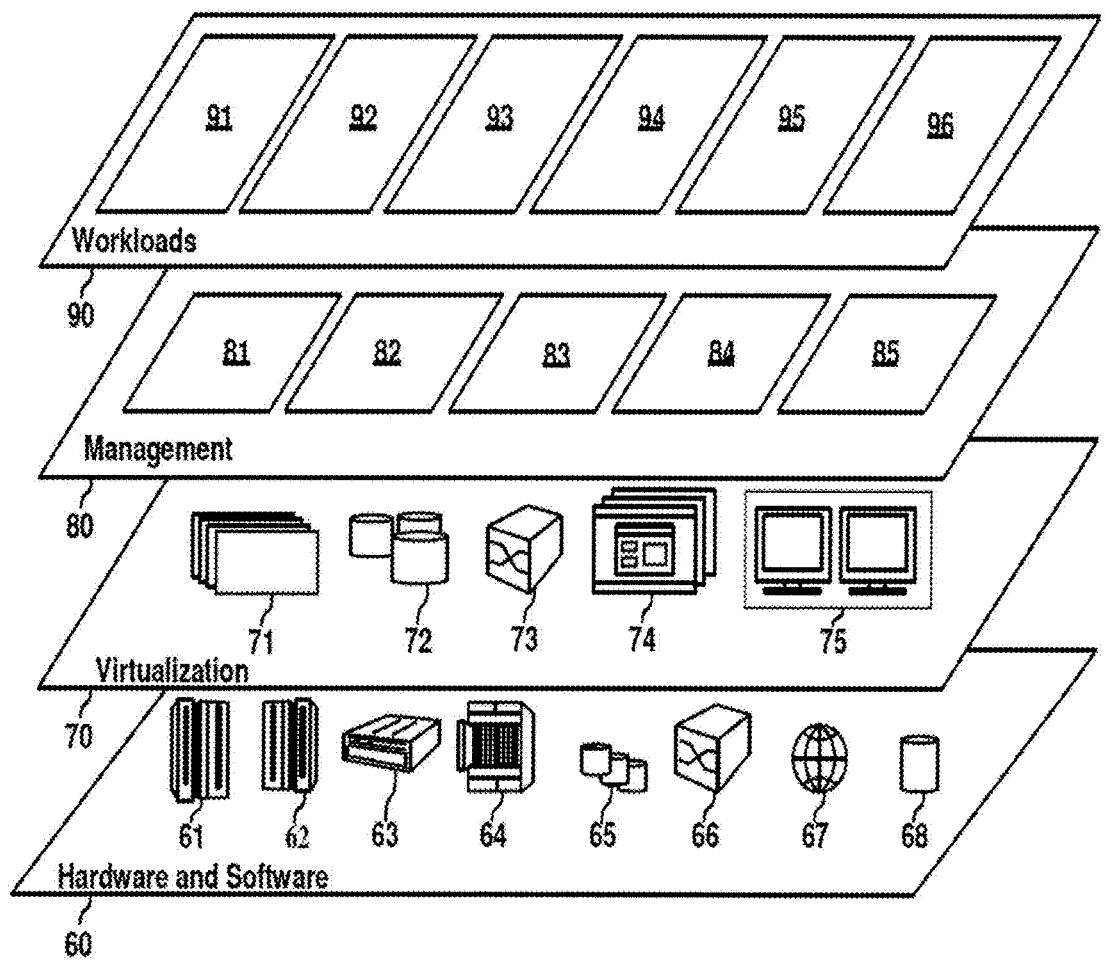
FIG. 8 depicts abstraction model layers, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing predictions of future performance of a data center battery system 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of optimizing performance of a data center battery system, the method comprising:
   receiving, by one or more processors of a computer system, information related to a data center battery system in real time;
   analyzing, by the one or more processors of the computer system, the received information in real time and calculating a current health score;
   predicting, by the one or more processors of the computer system, a future performance of the data center battery system;
   creating, by the one or more processors of the computer system, a predictive health score of the data center battery system based on the analyzing, wherein the predictive health score is calculated using variables that are weighted by factors, the variables including a current health score, a frequency of recently raising an alarm, battery degradation, and a frequency of using backup power;
   providing, by the one or more processors of the computer system, the predicted future performance of the data center battery system to a data center control system; and
   providing, by the one or more processors of the computer system, the predictive health score of the data center battery system to the data center control system; and
   controlling, by the one or more processors of the computer system, battery usage in the data center battery system based on the predictive health score.

2. The method of claim 1, wherein the future performance of the data center battery system is at least one of: 1) a charge to discharge cycle over time; 2) a temperature rate of change before capacity decreases; 3) a current rate of change before capacity decreases; 4) a voltage variance before capacity decreases; 5) a voltage variance after capacity decreases; 6) a frequency of changes in capacity level; 7) a battery depth of discharge; and 8) an internal resistance.

3. The method of claim 1, further comprising:
   determining, by the one or more processors of the computer system, that an undesired event is possible related to the data center battery system; and
   generating, by the one or more processors of the computer system, a notification to the data center control system that the undesired event is possible.

4. The method of claim 1, further comprising:
   monitoring, by the one or more processors of the computer system, a degradation rate of at least one battery in the data center battery system;
   determining, by the one or more processors of the computer system, that a charge is not good for the health of the at least one battery; and
   generating, by the one or more processors of the computer system, an alarm based on the determining that the charge is not good for the health of the at least one battery.

5. The method of claim 1, further comprising:
   selecting, by the one or more processors of the computer system, a set point related to battery usage of at least one battery in the data center battery system, wherein the selected set point is configured to provide the highest operational range to the at least one battery;
   providing, by the one or more processors of the computer system, the set point to the data center control system;
   maximizing, by the one or more processors of the computer system, an operational range of the at least one battery in the data century battery system based on the set point; and
   preventing a failure in the data center control system by implementing a battery state in the at least one battery based on the set point.

6. The method of claim 1, wherein the predicting the future performance of the data center battery system includes predicting the end of life of at least one battery of the data center battery system based on the analyzing and based on the physical properties of the at least one battery.

7. The method of claim 1, wherein the factors weighting the variables are calculated using time dependent functions.

8. A computer system, comprising:
   one or more processors;
   one or more memory devices coupled to the one or more processors; and
   one or more computer readable storage devices coupled to the one or more processors, wherein the one or more storage devices contain program code executable by the one or more processors via the one or more memory devices to implement a method of optimizing performance of a data center battery system, the method comprising:
      receiving, by the one or more processors of the computer system, information related to a data center battery system in real time;

analyzing, by the one or more processors of the computer system, the received information in real time and calculating a current health score;

predicting, by the one or more processors of the computer system, a future performance of the data center battery system;

creating, by the one or more processors of the computer system, a predictive health score of the data center battery system based on the analyzing, wherein the predictive health score is calculated using variables that are weighted by factors, the variables including a current health score, a frequency of recently raising an alarm, battery degradation, and a frequency of using backup power;

providing, by the one or more processors of the computer system, the predicted future performance of the data center battery system to a data center control system; and providing, by the one or more processors of the computer system, the predictive health score of the data center battery system to the data center control system; and controlling, by the one or more processors of the computer system, battery usage in the data center battery system based on the predictive health score.

9. The computer system of claim 8, the method further comprising:
determining, by the one or more processors of the computer system, that an undesired event is possible related to the data center battery system; and
generating, by the one or more processors of the computer system, a notification to the data center control system that the undesired event is possible.

10. The computer system of claim 8, the method further comprising:
monitoring, by the one or more processors of the computer system, a degradation rate of at least one battery in the data center battery system;
determining, by the one or more processors of the computer system, that a charge is not good for the health of the at least one battery; and
generating, by the one or more processors of the computer system, an alarm based on the determining that the charge is not good for the health of the at least one battery.

11. The computer system of claim 8, the method further comprising:
selecting, by the one or more processors of the computer system, a set point related to battery usage of at least one battery in the data center battery system, wherein the selected set point is configured to provide the highest operational range to the at least one battery;
providing, by the one or more processors of the computer system, the set point to the data center control system; and
preventing a failure in the data center control system by implementing a battery state in the at least one battery based on the set point.

12. The computer system of claim 8, wherein the predicting the future performance of the data center battery system includes predicting the end of life of at least one battery of the data center battery system based on the analyzing and based on the physical properties of the at least one battery.

13. The computer system of claim 8, wherein the future performance of the data center battery system is at least one of: 1) a charge to discharge cycle over time; 2) a temperature rate of change before capacity decreases; 3) a current rate of change before capacity decreases; 4) a voltage variance before capacity decreases; 5) a voltage variance after capacity decreases; 6) a frequency of changes in capacity level; 7) a battery depth of discharge; and 8) an internal resistance.

14. The computer system of claim 8, wherein the factors weighting the variables are calculated using time dependent functions.

15. A computer program product, comprising a computer readable storage medium storing a computer readable program code, the computer readable program code comprising an algorithm that when executed by one or more processors of a computer system implements a method of predicting future performance of a data center battery system, the method comprising:

receiving, by the one or more processors of the computer system, information related to a data center battery system in real time;

analyzing, by the one or more processors of the computer system, the received information in real time and calculating a current health score;

predicting, by the one or more processors of the computer system, a future performance of the data center battery system;

creating, by the one or more processors of the computer system, a predictive health score of the data center battery system based on the analyzing, wherein the predictive health score is calculated using variables that are weighted by factors, the variables including a current health score, a frequency of recently raising an alarm, battery degradation, and a frequency of using backup power;

providing, by the one or more processors of the computer system, the predicted future performance of the data center battery system to a data center control system; and providing, by the one or more processors of the computer system, the predictive health score of the data center battery system to the data center control system; and controlling, by the one or more processors of the computer system, battery usage in the data center battery system based on the predictive health score.

16. The computer program product of claim 15, the method further comprising:
determining, by the one or more processors of the computer system, that an undesired event is possible related to the data center battery system; and
generating, by the one or more processors of the computer system, a notification to the data center control system that the undesired event is possible.

17. The computer program product of claim 15, the method further comprising:
monitoring, by the one or more processors of the computer system, a degradation rate of at least one battery in the data center battery system;
determining, by the one or more processors of the computer system, that a charge is not good for the health of the at least one battery; and
generating, by the one or more processors of the computer system, an alarm based on the determining that the charge is not good for the health of the at least one battery.

18. The computer program product of claim 15, the method further comprising:
selecting, by the one or more processors of the computer system, a set point related to battery usage of at least one battery in the data center battery system, wherein the selected set point is configured to provide the highest operational range to the at least one battery;

providing, by the one or more processors of the computer system, the set point to the data center control system; and preventing a failure in the data center control system by implementing a battery state in the at least one battery based on the set point.

19. The computer program product of claim 15, wherein the predicting the future performance of the data center battery system includes predicting the end of life of at least one battery of the data center battery system based on the analyzing and based on the physical properties of the at least one battery.

20. The computer program product of claim 15, wherein the factors weighting the variables are calculated using time dependent functions.

* * * * *